May 21, 1946.　　　　　　　G. E. DATH　　　　　　　2,400,490

SHOCK ABSORBER

Filed Sept. 23, 1943

Inventor
George E. Dath

By Henry Fuchs
Atty.

Patented May 21, 1946

2,400,490

UNITED STATES PATENT OFFICE 2,400,490

SHOCK ABSORBER

George E. Dath, Chicago, Ill., assignor to W. H. Miner, Inc., Chicago, Ill., a corporation of Delaware Application September 23, 1943, Serial No. 503,487

1 Claim. (Cl. 267—9)

This invention relates to improvements in shock absorbers, especially adapted for use as snubbing devices in connection with truck springs of railway cars.

One object of the invention is to provide a simple and efficient shock absorber functioning as a snubbing device for truck springs of railway cars, providing gradually increasing resistance as the same is compressed.

A further object of the invention is to provide a shock absorber, as described in the preceding paragraph, comprising a hollow friction member having inwardly converging friction surfaces and a cooperating friction member having resilient arms in sliding frictional engagement with the friction surfaces of the hollow member, wherein said friction members have shouldered engagement with each other to limit relative separation thereof.

Other objects of the invention will more clearly appear from the description and claim hereinafter following.

Figure 1:
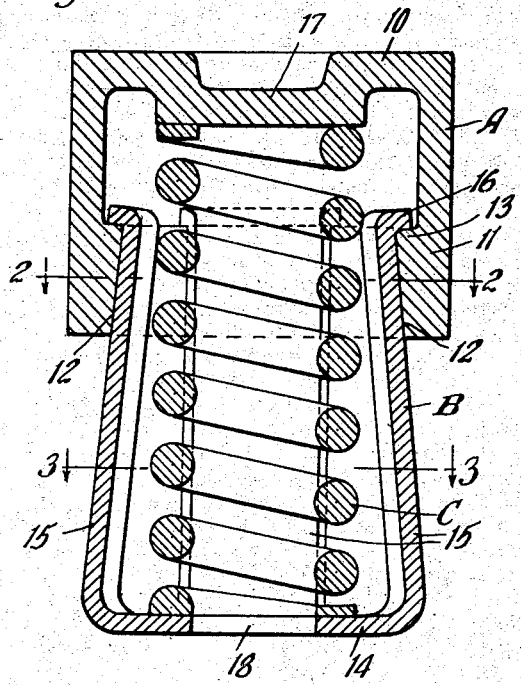
Figure 2:
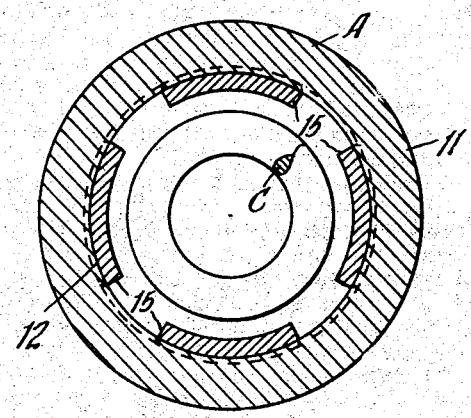
Figure 3:
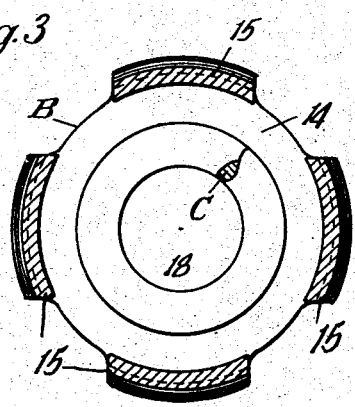

In the drawing forming a part of this specification, Figure 1 is a central, transverse, vertical sectional view of the improved shock absorber. Figures 2 and 3 are horizontal sectional views, corresponding respectively to the lines 2—2 and 3—3 of Figure 1.

As shown in said drawing, my improved shock absorber comprises broadly a hollow friction casing A; a friction member B having resilient arms telescoped within the casing; and spring resistance means C opposing relative movement of the casing A and member B.

The friction casing A is in the form of a relatively short, cylindrical, tubular member, open at the bottom end and closed at the top by a transverse end wall 10. Near the lower end the side walls of the casing A are thickened, as indicated at 11, said thickened side wall portions presenting an inwardly tapered friction shell section 12 having transversely curved, interior, friction surfaces which converge inwardly of the casing. At the inner ends of the thickened side wall portions 11, the casing A presents an annular retaining shoulder 13 for a purpose hereinafter described.

The friction member B is in the form of a slit tubular member formed of heavy spring steel, the same comprising a disclike plate section 14 provided with four upstanding arms 15—15—15—15. The arms 15 are spaced apart, as shown most clearly in Figures 3 and 4, and converge inwardly and upwardly in the assembled condition of the mechanism, as shown in Figure 1. Each arm 15 is curved transversely to fit the interior friction surfaces of the friction shell section 12 of the casing. At the upper ends, the arms 15 have outturned flanges 16 which overhang the shoulder 13 to engage therewith and limit relative separation of the friction casing A and friction member B.

The spring resistance C preferably comprises a single coil which is interposed between the disc 14 of the member B and the top wall 10 of the member A. This spring is preferably under initial compression.

The top wall 10 of the casing is provided with an inwardly projecting hollow boss 17 adapted to accommodate the usual centering projection on the top spring follower plate for the cluster of truck springs, and the disc 14 of the member B is provided with a central opening 18 adapted to accommodate the centering projection of the bottom spring follower plate for said cluster.

As is well known to those skilled in this art, my improved shock absorber or snubber replaces one or more of the spring units of a cluster of truck springs of a railway car and serves to dampen the action of the truck springs.

Figure 1 shows the normal expanded condition of the shock absorber. In the operation of my improved shock absorber, assuming the parts to be in the position shown in Figure 1, upon the spring cluster of the truck of the railway car being compressed between the spring follower plates, the members A and B will be forced toward each other, thereby forcing the spring arms 15—15—15—15 of the member B to slide inwardly on the friction surfaces of the friction shell section 12 of the member A, opposed by the spring resistance C. Due to the inherent resiliency of the arms 15—15—15—15 of the member B the same are forcibly held in frictional contact with the friction surfaces of the shell 12 during this action. It is further pointed out that the frictional resistance is progressively increased during compression of the device due to the taper of the friction shell section of the member A. Upon expansion of the coils of the truck springs, the truck spring followers are moved apart, permitting the spring C to return the parts of the shock absorber to the normal release position shown in Figure 1, lengthwise separation of the casing A and friction member B being limited by engagement of the flanges 16 of the arms 15—15—15—15 with the shoulder 13 of the casing A.

I have herein shown and described what I now consider the preferred manner of carrying out my invention, but the same is merely illustrative and I contemplate all changes and modifications that come within the scope of the claim appended hereto.

I claim:

In a shock absorber, the combination with a friction casing closed at one end and having an inwardly tapered friction shell section of cylindrical, transverse cross section at the other end; of an interior, annular shoulder at the inner end of said shell section; a one piece, integral friction member of spring material comprising a plurality of spaced arms arranged in circular series, and a transverse member connecting said arms at their outer ends, said arms being telescoped within said shell and having sliding frictional engagement with the interior walls thereof, said arms having outturned flanges at the inner ends overhanging said annular stop shoulder and adapted to engage the same to limit separation of said casing and member; and a spring within said casing interposed between the closed end of the casing and the transverse section of said member and yieldingly opposing relative approach of said casing and member.

GEORGE E. DATH.